United States Patent Office 3,494,915
Patented Feb. 10, 1970

3,494,915
6-(INDAN - 2 - AMINO - 2 - CARBOXAMIDO) AND 6 - (1,2,3,4 - TETRAHYDRONAPHTHALENE - 2 - AMINO - 2 - CARBOXAMIDO) PENICILLANIC ACIDS
Harvey E. Alburn, West Chester, Donald E. Clark, Norristown, Norman H. Grant, Wynnewood, and Peter B. Russell, Villanova, Pa., assignors to American Home Products Corporation, a corporation of Delaware
No Drawing. Filed July 28, 1967, Ser. No. 656,669
The portion of the term of the patent subsequent to July 4, 1984, has been disclaimed
Int. Cl. C07d 99/16; A61k 21/00
U.S. Cl. 260—239.1  3 Claims

ABSTRACT OF THE DISCLOSURE

The compounds are 6-(indan-2-amino-2-carboxamido) and 6-(1,2,3,4-tetrahydronaphthalene-2-amino-2-carboxamido)penicillanic acids which have improved antibiotic activity, particularly against gram-positive strains of bacteria.

SUMMARY OF THE INVENTION

This invention relates to new synthetic penicillins having potent activity against gram-negative and gram-positive micro-organisms, and particularly the latter.

The new synthetic penicillins of the present invention, when considered in their broadest aspects, include those compounds encompassed within the following structural formula:

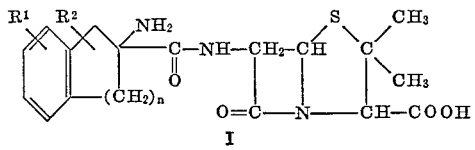

wherein $R^1$ and $R^2$ each may be selected from the group consisting of hydrogen, lower alkyl, lower alkoxy, aryl and aryloxy; and $n$ is an integer from 1 to 2.

The novel compounds of the invention may generally be prepared by reacting a suitable 4-substituted 2,5-oxazolidinedione (also known as an N-carboxy amino acid anhydride or NCA) with 6-amino penicillanic acid (6–APA). Preferably, a solution of 6–APA and triethylamine is first prepared which is slightly acid (e.g., pH 6). Thereafter the selected N-carboxy anhydride is added, and the reaction mixture stirred at room temperature. The novel compounds of the invention, resulting from the reaction between 6–APA and the N-carboxy amino acid anhydride may then be recovered by conventional procedures such as filtration, concentration, water extraction and precipitation from organic solvents, as indicated.

The N-carboxy amino acid anhydrides suitable for preparing the new penicillins of Formula I above when $n$ is 1; i.e. the 2-aminoindane-2-carboxylic acid NCA's, may be prepared by a synthesis which starts with the preparation, from a selected indene, of the corresponding 2-indanone by the method described by Rose, Dorfman and Linfield in the Journal of Organic Chemistry 29, 1793, 1964. The hydantoin of the 2-indanone may then be prepared by the generally known method of reacting the 2-indanone with ammonium carbonate and potassium cyanide in an organic solvent. The resulting 2-indanone hydantoin may then be transformed to the 2-aminoindane-2-carboxylic acid by ring splitting hydrolysis, as by heating in the presence of barium hydroxide. Finally, the NCA of the resulting 2-amino-indane-2-carboxylic acid may be prepared by the phosgenation of said acid.

The N-carboxy amino acid anhydrides suitable for use in the preparation of the novel penicillanic acid compounds of this invention may also be prepared by other known procedures such as those referred to or described, for example, in U.S. Patent No. 3,194,802 of H. E. Alburn, N. H. Grant and H. Fletcher III.

The N-carboxyanhydrides suitable for preparing the new penicillins of Formula I wherein $n$ is 2; i.e., the 1,2,3,4-tetrahydronaphthalene-2-amino-2-carboxylic acid NCA's, may be prepared by a general synthesis similar to that set forth above, with merely the substitution of a selected 1,2,3,4-tetrahydronaphthalene for the indene starting material of the first synthesis.

The foregoing general synthesis may be represented schematically as follows:

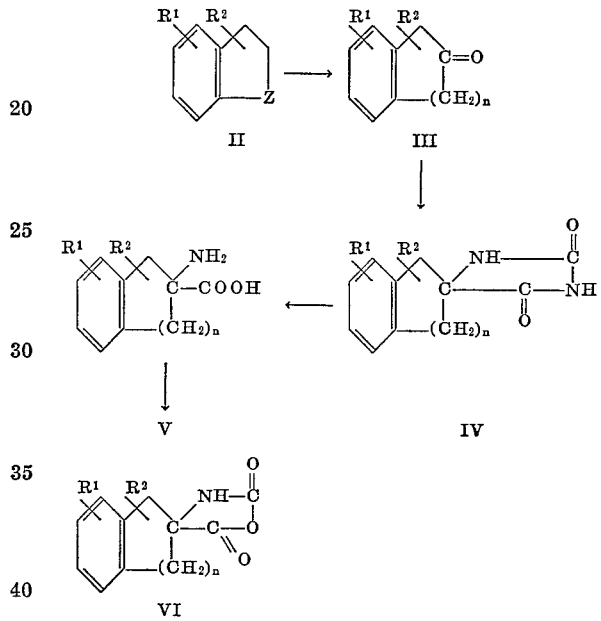

wherein $R^1$, $R^2$ and $n$, each has the same meaning as set forth with respect to Formula I above, and Z is a trivalent hydrocarbon of the group consisting of:

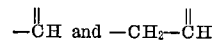

The new penicillin compounds of the series defined above show desirable broad spectrum antibacterial activity and are useful as therapeutic agents for poultry and mammals in the treatment of infectious diseases caused by gram-positive and gram-negative bacteria, and of surprisingly greater activity with respect to the former, and particularly strains of Streptococcus and Staphylococcus, by either parenteral or oral administration. They also have use as nutritional supplements in animal feed.

As will be understood by those skilled in the art, the penicillin compounds of the invention may be utilized in their acid form or in the form of the therapeutically-active salts thereof, e.g., the sodium or potassium salts, or hydrochloride, sulfate, fumarate, etc., or in the form of the pharmaceutically-acceptable acid addition salts prepared by the reaction of the penicillin compounds with an amine or diamine base, e.g., procaine or various N-N'-disubstituted alkylene diamines, such as N,N'-dibenzylethylene-diamine, etc.

As will also be understood by those skilled in the art, the compounds of the invention may be utilized in suitable dosage forms, including solutions, suspensions, tablets, capsules, and the like, utilizing conventional solvents, suspensoids, excipients, and the like.

The following examples are illustrative of the inven-

3 tion, but are not to be considered necessarily limitative thereof:

EXAMPLE I

6-(indan-2-amino-2-carboxamido)penicillanic acid (A) Preparation of 2-indanone.—325 ml. of 99% formic acid, 43 ml. of water, and 70 ml. of 30% hydrogen peroxide were mixed and warmed to 35° C. over fifteen minutes. Freshly distilled indene (58.1 gms.) was added over 2 hours while maintaining a temperature of 34–36° C. with a cool water bath. The mixture was stirred an additional hour at 34–36° C. and then overnight at room temperature.

10.6 gms. of the heptahydrate of ferrous sulfate were added in 53 ml. of water to remove the active oxygen compounds and the solution was concentrated to 170 ml. in vacuo. A solution of 140 ml. of concentrated $H_2SO_4$ in 860 ml. of water was added and 200 ml. of distillate was steam distilled. The distillate was extracted with 3× 100 ml. of methylene chloride. The extracts were combined and washed with 500 ml. of water, dried over $Na_2SO_4$, filtered, and evaporated to an oil which crystallized. M.P. 57–59° C. 67%.

(B) Preparation of 2-indanone hydantoin.—2-indanone, 22.5 gms. (0.17 mole), ammonium carbonate monohydrate 48.5 gms. (0.425 mole), and potassium cyanate 16.3 gms. (0.25 mole) were mixed in 210 ml. of formamide and heated in a pressure bomb at 100° C. overnight. The cooled reaction was diluted with 600 ml. of water and acidified with concentrated HCl to pH 2 with good ventilation. The precipitate was filtered, washed with water and dried. M.P. 255-7° C. Yield: 46.5 gms. wet. The material was purified by dissolving in 5% aqueous NaOH, extracting with ether, and acidified. M.P. 260–262° C.

(C) Preparation of 2-aminoindane-2-carboxylic acid.—2-indanone hydantoin 55.75 gms. (0.273 mole), barium hydroxide octahydrate 215 gms. (0.685 mole) and 300 ml. of water were heated in a bomb at 200° C. for 20 hours. The pressure reached 250 p.s.i. The hydrolysis mixture was acidified with concentrated HCl to pH 2, heated to boiling, treated with Darco G-60 and filtered. 38 ml. of concentrated $H_2SO_4$, was added to the filtrate with stirring and the slurry was heated and filtered. The $BaSO_4$ precipitate was washed with hot water and the combined filtrates were evaporated to dryness. The residue was dissolved in 100 ml. of water and adjusted to pH 4.5 with aqueous NaOH and chilled. The product was dried. A second crop was obtained by concentrating the mother liquor.

Yield: 1st crop, 12.2 gms.; M.P. 309–311° C.; 2nd crop 3.8 gms.; M.P. 291–293° C.; Total, 16.0 gms.; 33%.

(D) Preparation of 2-aminoindane - 2 - carboxylic acid NCA.—2-aminoindane - 2 - carboxylic acid 11.9 gms. (0.068 mole) was stirred in 250 ml. of anhydrous dioxane, and phosgene was introduced as the temperature was raised to 90° C. The temperature was maintained at 90° C. for 2 hours as phosgene was bubbled into the solution. The phosgene was stopped and the reaction was flushed with dry nitrogen at room temperature overnight. The solvent was removed in vacuo and the residue was triturated with hexane, and filtered. Yield: 12.0 gms., 89% M.P. 123-125° C. This was recrystallized from ethyl acetate-hexane. Yield: 8 gms., 59% M.P. 156–157° C.

(E) 6-indan - 2 - amino - 2 - carboxamido)penicillanic acid.—Five grams of N-carboxy-indan-2-amino-2-carboxylic acid anhydride was added with stirring to a solution containing 5.6 gms. of 6–APA in 100 ml. of water adjusted to pH 6.0 with triethylamine. The reaction mixture was stirred overnight at room temperature, then adjusted to pH 5.0 and the insoluble product collected. After drying in vacuo at room temperature, it weighed 6.6 g.

*Analysis.*—Calcd. for $C_{18}H_{21}N_3O_4S \cdot 2H_2O$: C, 52.5; H, 6.1; N, 10.2. Found: C, 52.6; H, 6.0; N, 10.1.

EXAMPLE II

Following the procedures of Example I, A–E, the appropriate 2-indanones, or 1,2,3,4-tetrahydro-naphthanones, and the corresponding hydantoins, carboxylic acids, and ultimate N-carboxy amino acid anhydrides thereof, were prepared, and the latter, as given in Table A below, were respectively reacted with 6–APA to obtain the respective penicillin products also given in the the table.

TABLE A

| N-Carboxy Amino Anhydride of— | Penicillanic Acid Product formed |
|---|---|
| 2-amino-1,2,3,4-tetrahydro-6-methoxy-2-naphthoic acid | 6-(2-amino-1,2,3,4-tetrahydro-6-methoxy-2-naphthamido)penicillanic acid. |
| 2-amino-1,2,3,4-tetrahydro-7-ethoxy-2-naphthoic acid | 6-(2-amino-1,2,3,4-tetrahydro-7-ethoxy-2-naphthamido)penicillanic acid. |
| 2-amino-1,2,3,4-tetrahydro-3,6-dimethyl-2-naphthoic acid | 6-(2-amino-1,2,3,4-tetrahydro-3,6-dimethyl-2-naphthamido)penicillanic acid. |
| 2-amino-4-phenyl-2-indancarboxylic acid | 6-(Indan-2-amino-4-phenyl-2-carboxamido)penicillanic acid. |
| 2-amino-3-phenoxy-2-indancarboxylic acid | 6-(Indan-2-amino-3-phenoxy-2-carboxamido)penicillanic acid. |
| 2-amino-4-butyl-2-indancarboxylic acid | 6-(Indan-2-amino-4-butyl-2-carboxamido)penicillanic acid. |

We claim:
1. A compound having the formula:

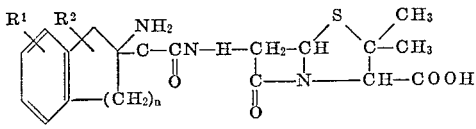

wherein $R^1$ and $R^2$ are each selected from the group consisting of hydrogen, lower alkyl, lower alkoxy, phenyl and phenoxy; and $n$ is an integer from 1 to 2.

2. A compound as defined in claim 1, which compound is:
   6-(indian - 2 - amino - 2 - carboxamido)penicillanic acid.

3. A compound as defined in claim 1, where $n$ represents the integer 1.

References Cited

UNITED STATES PATENTS 3,329,675   7/1967   Alburn et al. _____ 260—239.1

NICHOLAS S. RIZZO, Primary Examiner

U.S. Cl. X.R.
424—271

PO-1050
(5/69)

UNITED STATES PATENT OFFICE
CERTIFICATE OF CORRECTION

Patent No. 3,494,915      Dated February 10, 1970

Inventor(s) Harvey E. Alburn et al

It is certified that error appears in the above-identified patent and that said Letters Patent are hereby corrected as shown below:

In column 2, lines 16-20, formula II, which appears as follows:

"
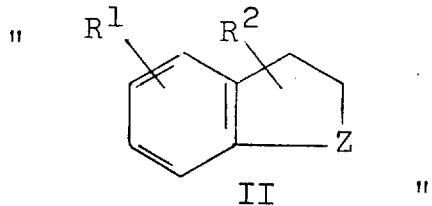
II
"

should read:

--
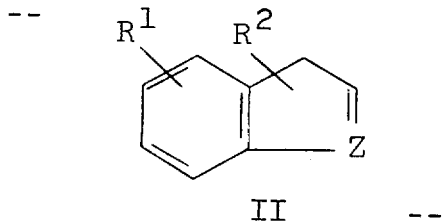
II
--

In column 4, line 3, (claim 2) "indian" should read --indan--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,494,915    Dated February 10, 1970

Inventor(s) Harvey E. Alburn et al

It is certified that error appears in the above-identified patent and that said Letters Patent are hereby corrected as shown below:

In column 4, line 9, that portion of the name of the compound which reads "6-indan" should read --6-(indan--; and in column 4, line 45, in the formula, the group appearing as $$\text{"-CN-H-"} \atop \underset{O}{\|}$$

should read    $-- -\underset{\underset{O}{\|}}{C}-NH- --$.

SIGNED AND
SEALED
JAN 5 1971

(SEAL)
Attest:

Edward M. Fletcher, Jr.
Attesting Officer

WILLIAM E. SCHUYLER, JR.
Commissioner of Patents